US009026674B1

(12) United States Patent
Kanna et al.

(10) Patent No.: US 9,026,674 B1
(45) Date of Patent: May 5, 2015

(54) SYSTEM AND METHOD FOR ACCURATELY DISPLAYING COMMUNICATIONS TRAFFIC INFORMATION (76) Inventors: Satish K Kanna, San Jose, CA (US); Cengiz Alaettinoglu, Sherman Oaks, CA (US); Roopesh Palasdeokar, Chaitanyanagar (IN)

( * ) Notice: Subject to any disclaimer, the term of this patent is extended or adjusted under 35 U.S.C. 154(b) by 232 days.

(21) Appl. No.: 12/661,769

(22) Filed: Mar. 22, 2010

(51) Int. Cl.
G06F 15/16 (2006.01)
G06F 15/173 (2006.01)
H04L 12/26 (2006.01)

(52) U.S. Cl.
CPC .................. *H04L 12/2626* (2013.01)

(58) Field of Classification Search
CPC ............ H04L 12/2613; H04L 12/5689; H04L 12/569; H04L 43/026; H04L 45/38; H04L 47/10; H04L 47/125; H04L 47/2483; H04L 47/41; H04L 49/9068; H04L 61/6077; H04L 2012/5619; H04L 2012/6443
USPC ......................................................... 709/242
See application file for complete search history.

(56) References Cited

U.S. PATENT DOCUMENTS

| | | | | |
|---|---|---|---|---|
| 6,785,735 B2* | 8/2004 | Garakani et al. | ............... | 709/238 |
| 6,956,821 B2* | 10/2005 | Szviatovszki et al. | ........ | 370/237 |
| 6,970,924 B1* | 11/2005 | Chu et al. | ....................... | 709/224 |
| 7,031,895 B1* | 4/2006 | Takahashi et al. | ............... | 703/13 |
| 7,243,143 B1* | 7/2007 | Bullard | .......................... | 709/223 |
| 7,260,518 B2* | 8/2007 | Kerr et al. | ......................... | 703/27 |
| 7,334,047 B1* | 2/2008 | Pillay-Esnault | .............. | 709/242 |
| 7,385,924 B1* | 6/2008 | Riddle | ........................... | 370/235 |
| 7,525,920 B2* | 4/2009 | Guerin et al. | .................. | 370/238 |
| 7,529,192 B2* | 5/2009 | Labovitz | ......................... | 370/236 |
| 7,554,930 B2* | 6/2009 | Gaddis et al. | ................... | 370/254 |
| 7,558,276 B2* | 7/2009 | Vasseur et al. | ................ | 370/401 |
| 7,584,298 B2* | 9/2009 | Klinker et al. | ................ | 709/238 |
| 7,593,341 B1* | 9/2009 | Buriol et al. | ................... | 370/238 |
| 7,619,982 B2* | 11/2009 | Blair et al. | ...................... | 370/248 |
| 7,639,613 B1* | 12/2009 | Ghannadian et al. | ......... | 370/232 |
| 7,664,876 B2* | 2/2010 | Garcia-Luna-Aceves et al. | ............................. | 709/240 |
| 7,707,305 B2* | 4/2010 | Afek et al. | ..................... | 709/238 |
| 7,730,294 B2* | 6/2010 | Asnis | ............................ | 713/100 |
| 7,743,139 B1* | 6/2010 | Golan et al. | ................... | 709/224 |
| 7,747,954 B2* | 6/2010 | Farid et al. | ..................... | 715/736 |
| 7,778,191 B2* | 8/2010 | Sun | ............................... | 370/244 |
| 7,830,896 B2* | 11/2010 | Srivastava | ..................... | 370/401 |
| 7,855,974 B2* | 12/2010 | Merkey et al. | ................. | 370/252 |
| 7,865,615 B2* | 1/2011 | Mirtorabi et al. | ............. | 709/242 |
| 7,889,668 B2* | 2/2011 | He | .................................. | 370/242 |
| 7,903,650 B2* | 3/2011 | Zhao et al. | .................... | 370/389 |
| 7,920,572 B2* | 4/2011 | Bates et al. | ................. | 370/395.2 |
| 7,944,844 B2* | 5/2011 | Ee et al. | ........................ | 370/248 |

(Continued)

OTHER PUBLICATIONS

Brownlee, N. et al. "Traffic Flow Measurement: Architecture," RFC 2722, Oct. 1999.*

(Continued)

*Primary Examiner* — Melvin H Pollack
(74) *Attorney, Agent, or Firm* — Hulsey Hunt, P.C.

(57) ABSTRACT

A system and method uses path information to project traffic information from flow- or IPFix-type messages onto one or more paths that may have been taken by packets corresponding to such messages. Traffic information from a message is projected from the router interface from which the message was received, along the path or paths the packets corresponding to the message may have taken, but only to the next router interface that provides such messages.

18 Claims, 4 Drawing Sheets

(56) References Cited

U.S. PATENT DOCUMENTS

| | | | |
|---|---|---|---|
| 7,945,658 B1* | 5/2011 | Nucci et al. | 709/224 |
| 7,962,582 B2* | 6/2011 | Potti et al. | 709/220 |
| 8,031,715 B1* | 10/2011 | Chang et al. | 370/392 |
| 8,037,175 B1* | 10/2011 | Apte et al. | 709/224 |
| 8,051,167 B2* | 11/2011 | Dolganow et al. | 709/224 |
| 8,072,985 B2* | 12/2011 | Golan et al. | 370/395.32 |
| 8,089,895 B1* | 1/2012 | Mackie | 370/252 |
| 8,160,056 B2* | 4/2012 | Van Der Merwe et al. | 370/351 |
| 8,194,646 B2* | 6/2012 | Elliott et al. | 370/352 |
| 8,218,447 B2* | 7/2012 | Rajan et al. | 370/238 |
| 8,239,565 B2* | 8/2012 | Irino et al. | 709/234 |
| 8,483,685 B2* | 7/2013 | Ghai et al. | 455/435.1 |
| 2004/0015583 A1* | 1/2004 | Barrett et al. | 709/224 |
| 2007/0283007 A1* | 12/2007 | Keir et al. | 709/224 |
| 2008/0281963 A1* | 11/2008 | Fletcher et al. | 709/224 |
| 2009/0016236 A1* | 1/2009 | Alcala et al. | 370/253 |
| 2009/0070486 A1* | 3/2009 | Visser | 709/238 |
| 2009/0307334 A1* | 12/2009 | Maltz et al. | 709/219 |
| 2010/0094986 A1* | 4/2010 | Zuckerman et al. | 709/223 |
| 2010/0280858 A1* | 11/2010 | Bugenhagen | 705/7 |
| 2011/0022728 A1* | 1/2011 | Kern et al. | 709/242 |
| 2011/0040391 A1* | 2/2011 | Noecker et al. | 700/19 |
| 2011/0093586 A1* | 4/2011 | Garcia-Luna-Aceves et al. | 709/224 |
| 2011/0299395 A1* | 12/2011 | Mariblanca Nieves | 370/235 |
| 2012/0220288 A1* | 8/2012 | Huber et al. | 455/422.1 |
| 2012/0221955 A1* | 8/2012 | Raleigh et al. | 715/736 |
| 2013/0305299 A1* | 11/2013 | Bergstrom et al. | 725/93 |
| 2014/0140213 A1* | 5/2014 | Raleigh et al. | 370/235 |

OTHER PUBLICATIONS

Fortz, B. et al. "Traffic Engineering with Traditional IP Routing Protocols," IEEE Communications Magazine, vol. 40, Issue 10, Oct. 2002, pp. 118-124.*

Plonka, Dave. "FlowScan: A Network Traffic Flow Reporting and Visualization Tool," USENIX Association, Proceedings of the 14th Systems Administrative Conference (LISA), Dec. 2000, pp. 305-317.*

McQuillan, JM et al. "The New Routing Algorithm for the ARPANET," IEEE Transactions on Communications, vol. 28, Issue 5, May 1980, pp. 711-719.*

Kohler, Eddie et al. "The Click Modular Router," Journal ACM Transactions on Computer Systems (TOCS), vol. 18, Issue 3, Aug. 2000, pp. 263-297.*

Trammel, B. et al. "Bidirectional Flow Export Using IP Flow Information Export (IPFIX)," RFC 5103, Jan. 2008.*

Claise, B. "Specification of the IP Flow Information Export (IPFIX) Protocol for the Exchange of IP Traffic Flow Information," RFC 5101, Jan. 2008.*

Quittek, J. et al. "Requirements for IP Flow Information Export (IPFIX)," RFC 3917, Oct. 2004.*

Claise, B. "Cisco Systems Netflow Services Export Version 9," RFC 3954, Oct. 2004.*

* cited by examiner

SYSTEM AND METHOD FOR ACCURATELY DISPLAYING COMMUNICATIONS TRAFFIC INFORMATION

RELATED APPLICATIONS

The subject matter of this application is related to the subject matter of application Ser. No. 11/906,424 entitled, "System and Method for Identifying Cost metrics for a Network" filed on Oct. 1, 2007 by Van Jacobson and Haobo Yu having the same assignee as this application and incorporated herein by reference in its entirety.

FIELD OF THE INVENTION

The present invention is related to computer software and more specifically to computer software for reporting communications traffic.

BACKGROUND OF THE INVENTION

It can be desirable to accurately display information about communications traffic, such as that which flows through routers in a communications network. Being able to accurately display communications traffic information can help the recipient of the information identify the source of problems, to better configure the network, or to expand portions of the network to eliminate bottlenecks or other problems.

What is needed is a system and method that can accurately display information about communications traffic.

SUMMARY OF INVENTION

The system and method of the present invention receives routing messages from a network that allow the route or possible routes a communication will take to be identified, and timestamps and stores such messages. Information allowing a router interface index to be identified with its associated network IP address is retrieved from at least the routers that will provide information about traffic received by that router, and such information is timestamped and stored. Messages about traffic in the network, such as conventional Netflow flow messages or other similar messages (such as IPFix) are received from fewer than all the routers in the network, but at least one such router having the possibility of carrying traffic that was carried by a different router from which Netflow flow messages or other similar messages are also being received by the system and method. Such messages are timestamped and stored. Each time such a message is received, the state of the network from the routing messages applicable at the time of the message is timestamped and stored. Each of the above functions may be performed as part of continuously running processes that can receive or retrieve information independently of one another.

When a user requests a report corresponding to a time period of interest, the flow messages received during the period of interest are projected from each node reporting such a flow along the nodes or links or both in the path, or possible paths, identified by the routing messages in effect at the time of receipt of such flow messages to either the destination device (if such device is within the same autonomous system as the reporting routers), the border router or the destination AS. However, if another device in a path also reported flow information, the projection of the flow may only be made to the first such other device in the path. In one embodiment, a flow message may be projected onto different paths at different times, and each such projection may only be made to the first reporting interface in the path. In one embodiment, the flow messages received by a reporting interface in a path may be used to resolve ambiguities in the paths at a given time.

If the user requests a report for a period of time, the projections corresponding to that period are used to build the report. If the user requests information as part of the report for which linking of the same flow information from one device that reported flow information to the next is desirable, the flow information may be linked together so that the various projections of the same flow are treated as a single projection, and the report allows utilization of all of the information so linked.

The projections may be made without a centralized flow message repository for all the routers that reported flow information. In one embodiment, only the identifiers (e.g. IP addresses of the router interface or IP address of the router and interface index) of the router interfaces reporting such flow messages are routinely distributed to make the projections. The flow messages themselves may be received and stored by multiple, distributed devices and need not be centralized in order to allow the projections to be made. Even when different flow messages are linked as described above, the linking and processing of the flow messages may also be performed using a distributed architecture. Such an architecture can reduce the traffic impact of the flow messages that would otherwise occur if the flow messages were centrally stored.

In one embodiment, instead of projecting all reported flows, but only to the first device that will also report the flow information, the flow is only projected from a router to its destination, border router or destination AS if no other router will project the flow in a path that includes the router.

Any routers used to provide flow information may be interior to the border of the AS in which such router is contained and not border routers, though they are not required to be interior routers.

DETAILED DESCRIPTION OF A PREFERRED EMBODIMENT

Figure 1:
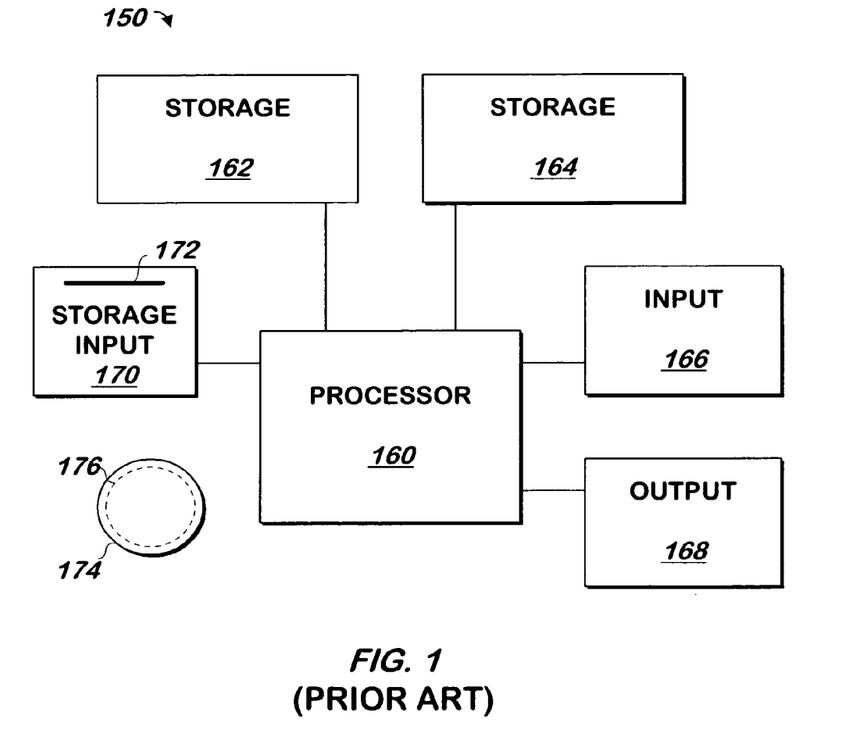
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used.

Figure 2A:
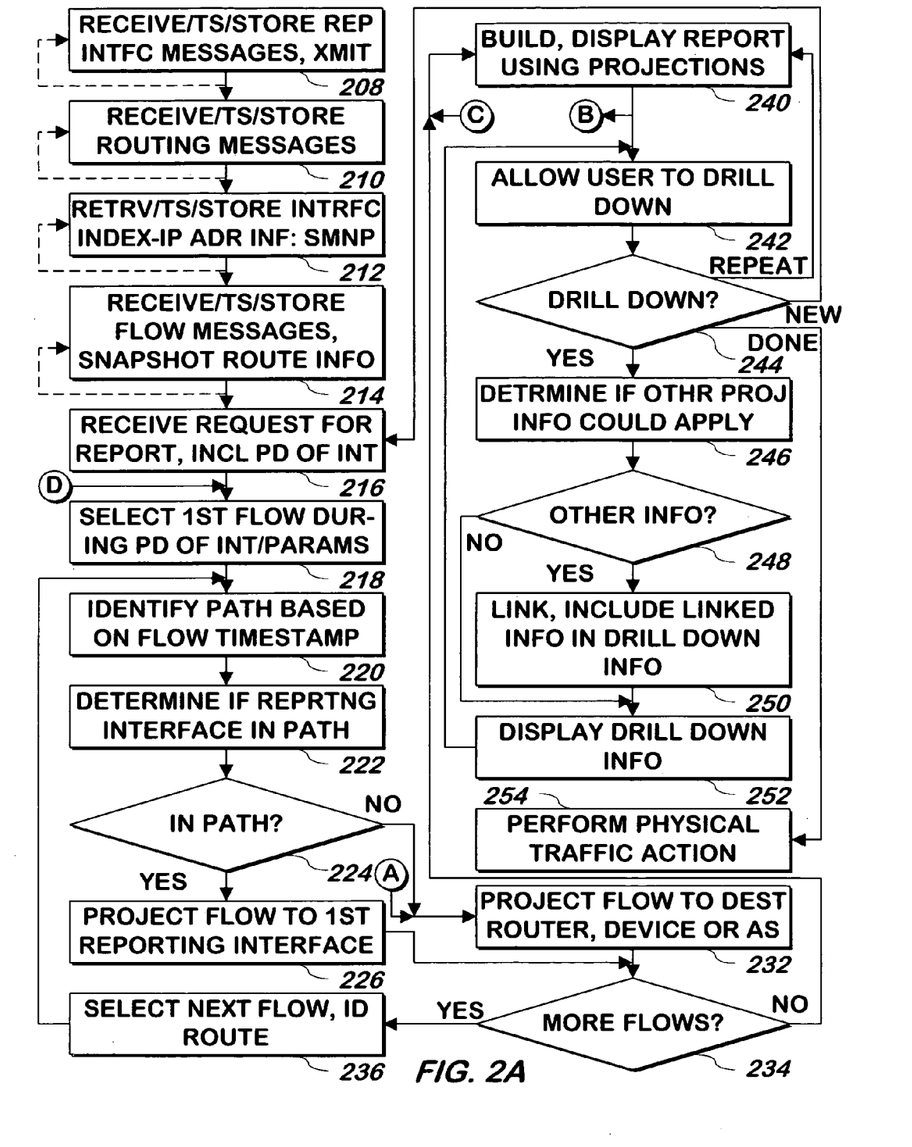
FIG. 2A is a flowchart illustrating a method of reporting traffic information and using the traffic information reported according to one embodiment of the present invention.

FIG. 2A is a flowchart illustrating a method of providing traffic information according to one embodiment of the present invention.

Receive Routing Messages.

Routing messages are received, timestamped and stored 210. In one embodiment, routing messages may include conventional BGP messages, and/or conventional IGP messages, such as OSPF messages, ISIS messages and EIGRP messages, each being known in the art. Timestamping information includes retrieving the then current date and time from a system clock, and storing the information associated with the date and time retrieved. Step 210 may be a continuously running process, that operates independently of the other steps, allowing routing messages to be received, timestamped and stored as they are received.

Retrieve IP Addresses of Index Interfaces.

For each router from which traffic information may be received as described herein and below, a list of the IP addresses of such routers and the passwords, if any, are received from a system administrator as part of a continuously running process, and a list of the interface indices of such router, and their respective IP addresses are periodically or occasionally retrieved via SNMP or by logging into the router, timestamped and stored 212 on a table of interface indexes and router IP addresses and the corresponding IP addresses of each index. Information for retrieving the information using SNMP and for retrieving such information after logging into routers is shown in Appendix A. Step 212 may operate as a continuously running, independent process to allow the IP addresses (and optionally, the passwords) of the routers to be received at any time, and the information retrieved as described above to be occasionally or periodically updated, timestamped, and stored.

Receive Flow Messages.

Conventional flow messages, for example, those provided by the conventional NETFLOW product commercially available from Cisco Systems, Inc., of San Jose, Calif., or other similar messages, are received 214 from multiple routers. Flow messages are sent from a router that describes traffic sent and/or received on one or more router interface and describe source and destination IP addresses and ports, protocol, the router interface (described by an IP address of the router and an index of the interface) through which messages having such IP addresses, ports and protocol were received during a period of time preceding the flow message (such messages referred to herein as a "flow") and a number of bytes and packets that transited the interface from that flow. Each flow message received may correspond to a set of packets, and the packets described by at least one flow message are different from the packets described by at least one other flow message, though some flow messages may refer to the same set of one or more packets. In one embodiment, at least one of the routers from which the flow messages are received has the potential to receive and provide a message describing the same flow that is described by flow messages received from a different router.

In one embodiment, as part of step 214, each time a flow message is received, all currently applicable or potentially applicable routing messages are built into a single snapshot that describes the next hop for each IP address or AS from every router or AS for which routing messages were received.

Maintain List of IP Addresses of Reporting Interfaces.

As part of step 214, as flow messages are received, a list of IP addresses of reporting interfaces and the dates and times that such reporting interface was providing flow messages is maintained. In one embodiment to maintain in such a list, the IP address of the router and the interface index from which the flow message was received are converted to the corresponding IP address of the interface using the information collected in step 212 and the IP address is compared to a list of IP addresses of reporting interfaces, the interfaces from which flow messages are received. If the IP address is on the list, and it has an associated ending time that is within a threshold amount of time from the current date and time, the current date and time is added to the list as the ending date and time for that IP address. If the IP address is not on the list, it is added to the list with the current date and time as the start time and end time for that entry on the list. If the IP address is on the list, but the current date and time is not within a threshold amount of time for the ending date and time for the entry, a new entry is added as described above.

User Requests Report.

At any time, a user may request a report. In one embodiment the report may specify a period of interest. The period of interest may be explicitly specified using a date range and time, or it may be identified automatically, without explicit date and time input from the user that identifies the range, for example, by presenting the user with a list of incidents (e.g. router or link up messages or messages or series of messages indicating a router or link is down) identified using the routing messages that are within a user specified date and time range, receiving a selection of one such incident, and then automatically identifying the period of interest as a predefined range of time surrounding and including the date and time of the routing message or messages corresponding to the selected incident. Such request for a report, and specification of the period of interest, as well as other parameters (e.g. flows that entered at a certain interface, or had a certain destination or source, for example) used to constrain the flows that are analyzed, is received 216.

A first flow message is selected 218. The flow message selected is one of the flow messages that correspond to the period of interest and any other parameters that was not already selected for the currently specified report. The route or routes that packets corresponding to the flow message would have taken at the time the flow message was received are identified 220. To identify the route or routes, the IP address of the router from which the message was received is used as the starting IP address of the message.

The path or paths that messages in the flow would have taken from the starting IP address are identified 220 using the routing messages in effect at the time of flow messaging is received, or at the range of time specified by the flow of message, and a routing algorithm, such as the conventional Shortest Path First algorithm, referred to as Dijkstra's algorithm. In one embodiment, a single route is assumed, and that route is the route that corresponds to the snapshot stored at the time the flow message was received, though in other embodiments, different paths may be identified based routing messages received during the duration of the flow as specified in the flow message. To determine the single path, the information in the snapshot corresponding to the flow message is used to identify the next hop router or device from the IP address of the reporting interface to the destination in the flow, and then the remaining next hop routers are identified, from one to the next, to the next, each using the information from the routing messages in the snapshot or snapshots for the period of time corresponding to the flow message, until the path to the destination is identified. The destination may be the edge router of the AS (autonomous system) corresponding to the interface supplying the flow message, the edge router of a multiple-AS being monitored, or a device within the AS or multiple-AS being monitored.

Even in the embodiment in which only the snapshot corresponding to the flow message is used to identify the path of the flow, there may nevertheless be several paths described by the routing messages during the period of time corresponding to the flow, for example, because there are two or more equally weighted paths to the destination, and, in one embodiment, all such paths may be identified. If there are multiple paths possible, all such paths may be identified as part of step 220.

In the embodiment in which all routing messages received during the period specified by the flow message may be used to identify multiple paths used by the packets corresponding to the flow, if routing messages indicate the paths may have changed during the period corresponding to the flow, these different paths also identified, as well as the starting and ending times of each period that the different paths would have been transited by the packets corresponding to the flow message. In the case of equal weighted paths, all such paths may be identified, and the start and end times that the paths could have been used are also identified.

In one embodiment, to identify a path, the nodes in the path are identified and stored.

Single Path.

There are multiple cases of paths possible. We start with the case that only a single path is identified for the flow. This may be because only the snapshot corresponding to the date and time the flow message is received is used to identify the path (or there were no routing changes that affected the path during the period corresponding to the flow message) and there were no equally weighted paths identified using the snapshot. Other cases of more than one path are described below.

Projecting the Flow onto the Path.

Once the path is identified, a determination is made 222 as to whether an interface from which flow messages were received at the time the selected flow message was received (referred to as a "reporting interface") was in the path of the flow at the time of that flow. If no reporting interface was in the path at the time 224, the information from the flow message is projected 226 onto the path, either to the destination device specified by the destination IP address in the flow information, to the AS corresponding to the destination specified in the flow message, or to a border router of the same AS as the reporting interface, or any number of these. If a reporting interface was in the path at the time of the flow 224, the information from the flow message is projected along the path to the first reporting interface in the path, not including the link to the reporting interface if flow messages or IPFix messages summarize ingress to the reporting interface, or including the link to the reporting interface if the flow messages or IPFix messages summarize egress from the reporting interface.

In one embodiment, the projection may be made in the reverse direction from the reporting interface. That is, the path to the reporting interface may be identified and the projection made along that path, at least to a point of ambiguity where the flow cannot be ascertained with certainty.

It is noted that the projection to this point is made without regard to whether a corresponding flow or IPFix message (or other similar message) was received from the reporting interface (e.g. due to sampling rates of less than one by each reporting interface, one reporting interface may report a flow, but another reporting interface that also received messages from the same flow may not in fact report any messages for that flow. When a projection is stopped at a different reporting interface without regard to whether flow or IPFix message (or other similar message) was received for the same flow at such reporting interface, the projection is referred to herein as having been performed "sinemessagely".

In one embodiment, projection is accomplished by storing the IP addresses of all of the nodes in the path along with a unique serial number assigned to the flow message when it was received, and stored associated with that flow message. This associates the IP addresses of the nodes with the information in the flow message. In another embodiment, the IP addresses of each node at either end of each link are stored associated with the serial number of the flow message to associate the links (each of which are identified by the nodes at each end of that link) with the flow message, and in another embodiment, both such associations are made.

Projecting a Single Flow onto Different Paths Due to Equal Weight Paths.

If multiple equal weight paths are identified for the flow from any given node, projection of the traffic may be made to each identified path in proportion with the number of paths identified. In such embodiment, in addition to the serial number of the flow as part of step 226, a weight of one divided by the number of equal weight paths identified (e.g. 0.5 if two equal weight paths are identified) is stored with each node or link as described above to indicate the probability of the flow traversing the link or node. The traffic from the flow message is multiplied by the weight to identify the traffic impact of the flow when such traffic is used in reports as described in more detail below.

In one embodiment, instead of projecting a weighted flow onto each equal weight path, at each fork, one of the equal weight branches is selected randomly or pseudo randomly, and the flow is projected only onto the path containing the selected branches.

Projecting the Flow onto Different Paths at Different Times Due to Network Events.

In one embodiment, all routing messages received during the period identified by the flow message as the period in which packets were received for the flow are used to determine the paths taken by packets corresponding to the flow. If a network event such as an outage, or addition or restoration of a link occurs during the period identified by the flow message, and that outage or other event would have caused the flow to traverse different paths before and after the event, an effective period is also assigned to the link or node with which the flow is associated as described above. The effective period has a start and stop time corresponding to the events that cause the link or node to be traversed or not traversed. If no start or end time is assigned, the start or end time of the flow message is assumed to start or end the effective period, respectively. As part of step 226, a weight of the flow is also assigned to each node or link as described above, calculated by dividing the effective period by the period identified by the flow so that the weight is proportional to the percentage of time of the period specified by the flow that the traffic from the flow traversed the nodes and links.

In the event that equal weight paths and different paths are in effect at the same time as part of step 226, each weight is multiplied to produce the weight assigned to the link, node or both.

Resolution of Equally Weighted Paths Using Reporting Interfaces.

In one embodiment, as part of step 222, an attempt is made to resolve the actual path of a flow that may have traversed more than one equal weight path by identifying if there are equally weighted paths that had a reporting interface in any of the paths at the time that path may have been used by packets from the flow. If a reporting interface was in one or more of the paths at the time, an attempt may be made to match the flow being projected to one of the flows received at any reporting interface in the path for example, by matching the source and destination IP addresses and ports and protocol and the approximate time from the selected flow message with those received out approximately the same time from any reporting interface, in any of the identified paths. If the flow was received at any reporting interface, the path or paths to that reporting interface is used to project the flow to the reporting interface. As the sampling rates for the flow messages or IPFix messages approach unity, such information may be more useful.

In one embodiment, if the flow was not reported as received at a reporting interface in any path, any identified path that traversed the reporting interface is not used to project the flow. In this case, the number of potential paths may be reduced or eliminated to either the actual path, or a smaller number of paths that the flow may have taken. A very high sampling rate, or even unity, may be helpful to employ this approach.

Select Another Flow and Start Again.

Following steps 226 and 232, the method continues at step 234. At step 234, if there are more flows corresponding to the request (i.e. they are within the period of study and optionally correspond to other parameters of the request), the next such flow is selected 236 and the method continues at step 220, using the newly selected flow. If there are no more flows 234, the method continues at step 240.

Build and Display Report.

At step 240, the requested report is displayed. The requested report may be a time lapse animation of cumulative traffic on each link in the network over the period of interest specified with the request for the report, or a period implied by the report, such as a period of time around a failure or other event, with nodes (and their IP addresses) displayed on a map. The cumulative traffic may use the flow messages, effective times and weights associated with each link as described above, so that the amount of traffic from the flow message associated with each node and/or link is multiplied by the weight to identify the amount of traffic from each flow. The effective time for each projection may be used to allow the cumulative traffic to be identified at a given point in time, with traffic for any period assumed to be evenly distributed during that period.

In one embodiment, a parameter of the report is a specification of a failure or link/node restoration, which may be interactively specified, for example, by requesting a list of nodes or links with the highest number of failures within a specified period, receiving a displayed list of such nodes, sorted in decreasing order of the number of failures during the specified period, each node specified as having at least the appearance of an HTML link. When the user clicks such an HTML link, a list of the dates and times of the failures and restorations experienced by the specified node or link is displayed as a set of links, and when the user clicks one of the dates and times displayed as links, a period around the date and time of the link or node failure is specified as part of a request for a report.

Drilling Down.

In one embodiment, the report allows a user to receive additional detail if such detail is desired. For example, each node and link on the animation may be displayed to appear as an HTML link to a detail report about that node or link. When the user clicks the HTML link, a list of data types available for the link or node corresponding to the clicked HTML link is displayed. Some of the data types correspond to data either in the flow messages that traversed the node or link corresponding to the node or link clicked (e.g. source or destination IP address, protocol, etc) and some of the data types correspond to the path of the flow (e.g. links or nodes traversed by flows that traversed the link or node corresponding to the HTML link clicked, neighbor AS traversed, source AS, destination AS, or any AS transited).

In one embodiment, the data types are displayed with the appearance of HTML links. When the user clicks one of the HTML-like links, the data corresponding to the data type clicked is displayed. For example, if the user selects a link between two nodes and then clicks on the "Source IP Address" data type, all of the source IP addresses from flow messages that traversed the selected link during the period of interest are displayed. The user may then click on one of these source IP addresses to select it.

When data from the list is selected, the remaining, data types (not previously selected) are displayed. When the user selects one of these data types, the data corresponding to the type is displayed, but only for the selected node or link and only having the value of the source IP address selected as described above. In this manner, the user can "drill down" on the data. Each time a data type and value for a data type is selected, for some or all of the data types, the data types displayed will exclude that data type and the previously selected data types and will be limited to data values corresponding to all data values selected for the various data types selected. Each time the user selects a data type and value, the projections of flow messages corresponding to the selected data types that correspond to the entire set of currently applicable drilled down data values are considered to remain in the report. The other flow messages and their projections are excluded from the report. The user may back out of a data value and or data type so that it will not be considered as having been selected, for example by using the back button on their browser. The data values displayed are only those values for the most recently selected data type from the flow messages remaining in the report.

Thus, if the user initially selects a node, then the data type "source IP address", the values of source IP addresses of the flow messages that were projected onto that node are displayed. If the user selects one of the values of the source IP addresses displayed, if the user selects the data type "destination port", only the values of destination ports from flow messages that were projected onto the selected node and also have the selected value of the source IP address are displayed.

In one embodiment, some or all reports allow the user to drill down 242 in this or a different manner. The user may elect not to drill down, but to repeat viewing the existing report (e.g. to see the animation again) or to start a different report. If the user repeats viewing the existing report 244, the method continues at step 240, where the same report is redisplayed. If the user elects to start a different report 244, the method continues at step 216.

Each time the user elects to drill down as described above 244, a determination is made as to whether information from one or more projections of one or more other flow messages that do not correspond to the currently selected set of drill down types and data values could apply to the report 246. For example, there may be other flow messages or IPFix messages whose projections did not traverse the selected link, but may be part of the same flow that did traverse the link. Information from other projections from other flow messages (other than the ones remaining in the report as described above) could apply to the report when the user selects a type of information that is not based on the information in the flow messages themselves, such as information that would have been based on the path taken by a flow.

In the example above, where the user selected a node, a source IP address value and then selects a value of a destination port, the user may select a data type of "prior nodes traversed". Because, in one embodiment, the applicable projections of flows would only start as far back as the reporting node for that projection, there may be prior nodes traversed by the projection of a flow message that represents the same flow, but at one or more links that precede the reporting interface in the path the entire flow actually took.

If such information could not apply to the report 248, the information from the drill down command is displayed 252 as described above and the method continues at step 242. If such information could apply to the report 248, the information from a flow that was projected to the reporting interface, but not further, is linked 250 to the flow that was projected from that reporting interface, for each such pair of flows that is identified as representing the same flow as any flow currently applicable to the report (because it meets the criteria of the report and also corresponds to all of the currently applicable types and data values for the report), as well as any flow that is linked to such flow. In one embodiment, a flow projected to an interface that represents the same flow as one received by that interface and projected out of it, is identified by one having the same source and destination IP address and port, the same protocol, and approximately the same starting time (e.g. within a half second, or the start of an effective period is not more than one half second from the timestamp) as the flow that was projected out of the interface.

In one embodiment, when a flow is projected to one or more reporting interfaces, the start of the effective period and the reporting interface to which the flow was projected is stored associated with the serial number of the flow, for each reporting interface to which the flow is projected, and the above identification may be performed using such information.

In one embodiment, linking may be accomplished by assigning a unique temporary flow identifier to all of the links and nodes that are considered linked, or by associating the linked flow identifiers in a table. When information is linked, the linked information is treated as a single flow for purposes of drilling down. Thus, the list of routers traversed would include routers traversed by all projections of the flow.

More than two projections may be linked, if, for example, a flow traversed more than two reporting interfaces.

An Alternate Embodiment

Use Subsequent Flow Messages Only to Resolve Ambiguities

As noted above, flow messages may be used to resolve, or partially resolve path ambiguities. If a subsequent flow message matching another flow message as described above is in one of several equal weight paths, it may be used to identify the actual path, or at least narrow down the number of potential paths that a message may have taken. If one of several equal weight paths has one or more reporting interfaces in one or more of the equal weight paths, if such reporting interface does not receive a flow message matching one that is being projected along the nodes or links of different equal weight paths including such reporting interfaces, the paths containing the reporting interfaces may be eliminated as potential paths among multiple equally weighted paths.

In one embodiment, such function is performed, but the projection of a first flow from a reporting interface in the path of a second flow is either not made, or not used for reports if the first and second flows match as described above. In such embodiment, any flows projected are projected as if no other reporting interface is in the path of the flow and the only projection of a flow will be the longest one, so no linking is required.

In this embodiment, the steps 222B-224B, and 226B of FIG. 2B replace the corresponding steps 222, 224 and 226, and 232 of FIG. 2A, respectively, as will now be described.

At step 222B, a determination is made as to whether another reporting interface in the path of the selected flow reported a matching flow as described above. If not, 224B, the method continues at step 232 of FIG. 2A. If so 224, the existence or non-existence of a matching flow message (as described above) from any such reporting interface may be used (if the sampling rate is near or at 1:1) to resolve or reduce the number of path ambiguities from equally weighted paths, and any existing projection of a matching flow from a reporting interface in the path is marked so that such projection will not be used in any report 226B, any matching flow from an interface in the path that has not been projected is marked so that it will not be projected and the method continues at step 232.

Step 236 only uses unmarked flow messages to select the next flow message. Step 240 only uses unmarked projections for the report. Steps 246-250 are not used, and step 252 follows step 246.

Practical Application of the Method.

In one embodiment, after the user is finished with the report 244, a physical traffic action is performed 254 using the information from the report. A physical traffic action is any action that can change the network in such a way that a route will be affected. For example, a physical traffic action may be the installation or removal of a router or link, or other action that affects routing of messages in the network, such as changing a weight of a link.

Simulation of Network Changes.

In one embodiment, a user may simulate the removal of a node or link in the network, the addition of a node or link, or a change in link cost (also known as the weight). The reports described above may then be run on the resulting simulated network. In one embodiment, the specification of the node or link to be removed or added or the change in link weight may be made after step 240, though in other embodiments, the specification of such topology changes may be made at a different point in FIG. 2A.

Figures 2B, 2C:
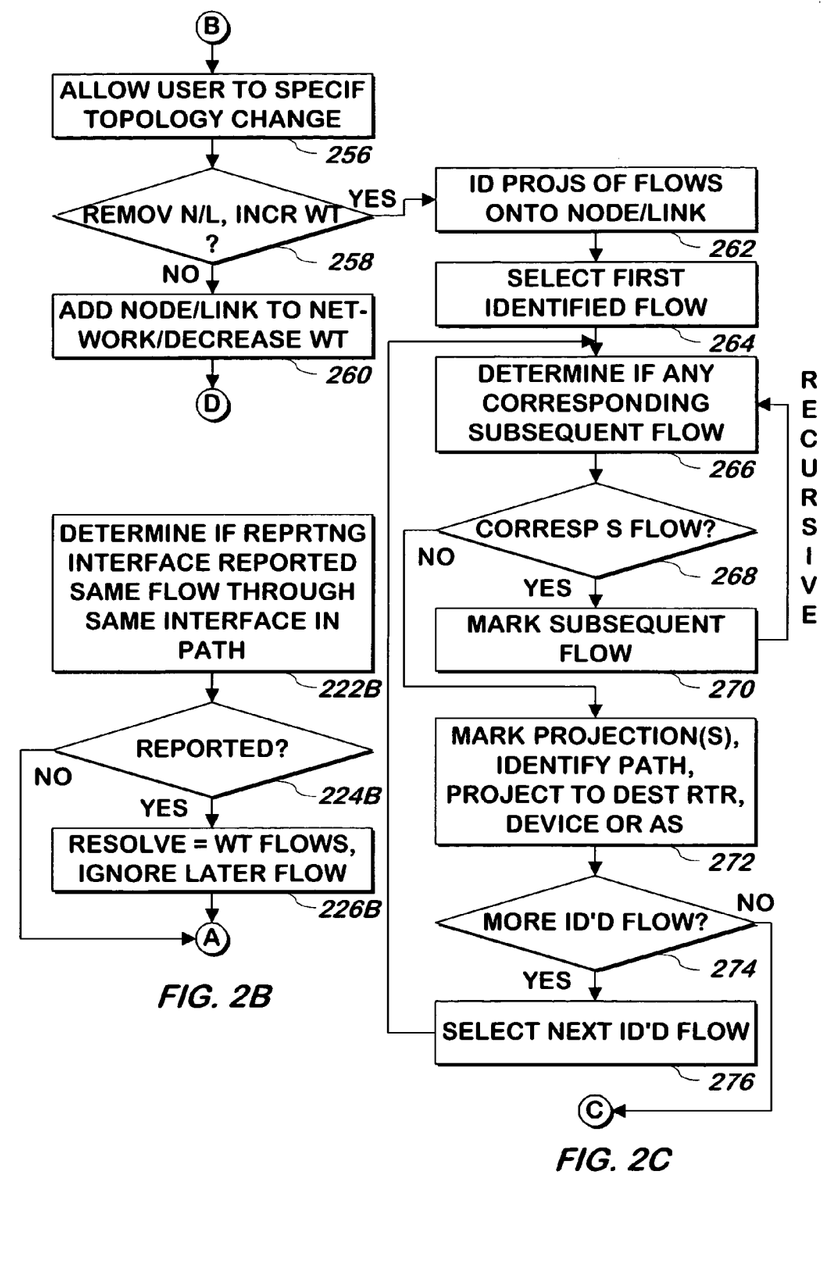
FIG. 2B is a portion of the flowchart of FIG. 2A illustrating an alternative embodiment of the present invention.
FIG. 2C is a flowchart integrated with the flowchart of FIG. 2A illustrating a method of removing a node or link according to one embodiment of the present invention.

Referring now to FIGS. 2A and 2C, following step 240, the user is allowed to specify a node or link to be added (along with the pertinent costs, or, if a node is added, along with the pertinent one or more links and their costs) or removed from the network or a link whose link cost is increased or decreased (along with the new link cost) along with an indication of which of these actions is to be simulated during the period of interest and such specification an indication is received 256. If the user indicates that, for the simulation, a node or link is to be added or that a weight or cost of a link is to be decreased 258, the node and/or link or links are added to the network, along with a unique identifier to allow the addition to be undone, or weights are altered and the method continues at step 218. Subsequent steps that identify paths and/or perform other functions related to topology will use the newly added node and or link or links and associated weights as part of the path identifications described herein.

If the user indicates that, for the simulation, a node or link is to be removed or that a weight or cost of a link is to be increased 258, the flow or flows that were projected onto the specified link, or on any link that starts or ends with the specified node is identified 262, and the first such projection is selected 264.

A determination is made 266 if there is a different projection for a corresponding flow that starts just past the end of the selected projection. A corresponding flow is one that was received at a different interface than the flow corresponding to the selected projection and has approximately the same time of receipt (within a threshold amount of time, such as a half second) and the same source and destination IP addresses and ports, and the same protocol. Just past the end of the selected flow may be defined to be no more than one node away from the end of the projection. If the projection has multiple paths, but was not resolved as described herein, the end of any path may be used.

If there is such a projection of a corresponding flow 268, the projection of the corresponding flow is marked 270 to indicate that the flow should not be used by a report. The marking may be made with a unique identifier assigned to the removal of the node or link, so that the mark may be removed if the specified node or link or weight is to be "put back". The reporting and drilling down described herein ignores any projection marked in this fashion.

The method then repeats recursively, using the most recently marked projection, to locate and mark corresponding flows near the end of the most recently marked projection, until all such projections have been marked, at which point, and the "no" branch of step 268 is taken and step 272 is performed.

At step 272, the selected flow is marked so that it will not be used in a report or drill down as described above and a new path is identified from the node prior to the earliest projected node marked as described above. The new path is identified using the routing messages applicable to the flow corresponding to the selected projection, but that does not use the node or link specified as being removed, or uses the increased link weight and the flow is projected to the destination router, device or autonomous system as part of step 272. It is noted that this projection does not stop at a node corresponding to a reporting interface. The projection may be made as described above, including projecting onto different paths, either due to equal weights or changes to network topology as described above. The projection is tagged with the identifier of the node removal so that it may be removed if the node or link removed or weight changed is "put back" to its former state.

In one embodiment, not only are subsequent corresponding flows detected and marked as not to be used in addition to the flow that was projected onto the specified node or link, but also corresponding flows preceding the selected flow projected onto the specified node or link may be marked, and the path recomputed from the earliest reporting interface that detected the flow either using only contiguous projections from the projection that used the specified link or node or any projection of a corresponding flow to the flow corresponding to the selected projection, with the new projection made from that point.

If there are more flows identified as described above 274, the next such identified flow is selected 276 and the method continues at step 266 using the newly selected flow. Otherwise 276, the method continues at step 240 in one embodiment, where the report described above is rerun for the newly configured network.

Distributed Message Collection.

In one embodiment, the method of the present invention described herein may be performed by multiple devices distributed throughout a communications network. For example, the communications network may be one or more autonomous systems, with one or more such devices per autonomous system ("AS"), though other arrangements and numbers of devices may be used. In such embodiment, step 208 may also be performed. Step 208 may operate as an independently operating process. In step 208, identifiers of the IP addresses of the reporting interfaces that report to such other devices are received from the other devices, and such IP addresses are timestamped and stored. Additionally, the IP addresses of the reporting interfaces that have been reporting flow messages or other similar messages such as IPFix messages within a threshold amount of time (e.g. ten minutes) of the current time are provided to the other devices, for example, via a multicast channel monitored by all such devices. As used herein, a "flow message" is considered to include both Netflow flow messages and IPFix messages and other similar messages, and a "flow" corresponds to the series of one or more packets such messages describe.

In this embodiment, the flow messages themselves need not be stored centrally nor distributed to the other devices. Only the IP addresses (or other identifiers) of the reporting interfaces are distributed. The flow/IPFix messages are stored locally at the device that received them. When flow or IPFix messages (or other similar messages) are stored in a distributed fashion, and all pertinent flow or IPFix messages (or other similar messages) for a report are not provided to a single device, the messages are referred to herein as "sinecentralized". Sinecentralized messages may be summarized and provided to the other devices.

A report may be generated by any device. In one embodiment, when a report is generated, if data is to be linked as described above, a request is sent to the other devices (e.g. via the multicast channel) that identifies the information being linked, and the other devices provide the flow messages that correspond to such request for information. The device receives the timestamped flow messages, temporarily stores them and uses such flow messages as if they had been received initially by that device.

To perform other reporting functions, such as the animated display of cumulated traffic described in the related application, in one embodiment, the device with which the user is communicating sends to the other devices information that the other devices can use to summarize the information needed for the report. For example, if the user request a cumulative display of traffic over time as described in the related application, where a map of the network being monitored (e.g. one or more autonomous systems) is displayed with the nodes as dots and the links as lines, where the lines get thicker and thicker in proportion to the cumulative traffic carried over those links as indicated by the flow or IPFix messages) an identifier of the type of report and the period of interest is broadcast to the other devices as a request for information, which return the amount of traffic during a number of equal time-length subdivisions of the period of interest, the number being specified or implied, and the other devices return the cumulative traffic for each link for projections they make as described herein. The device that provided the broadcast receives such information and uses it to provide the graph so as to indicate all flow messages, though the flow messages received by such other devices need not be sent to the requesting device.

Figure 3:
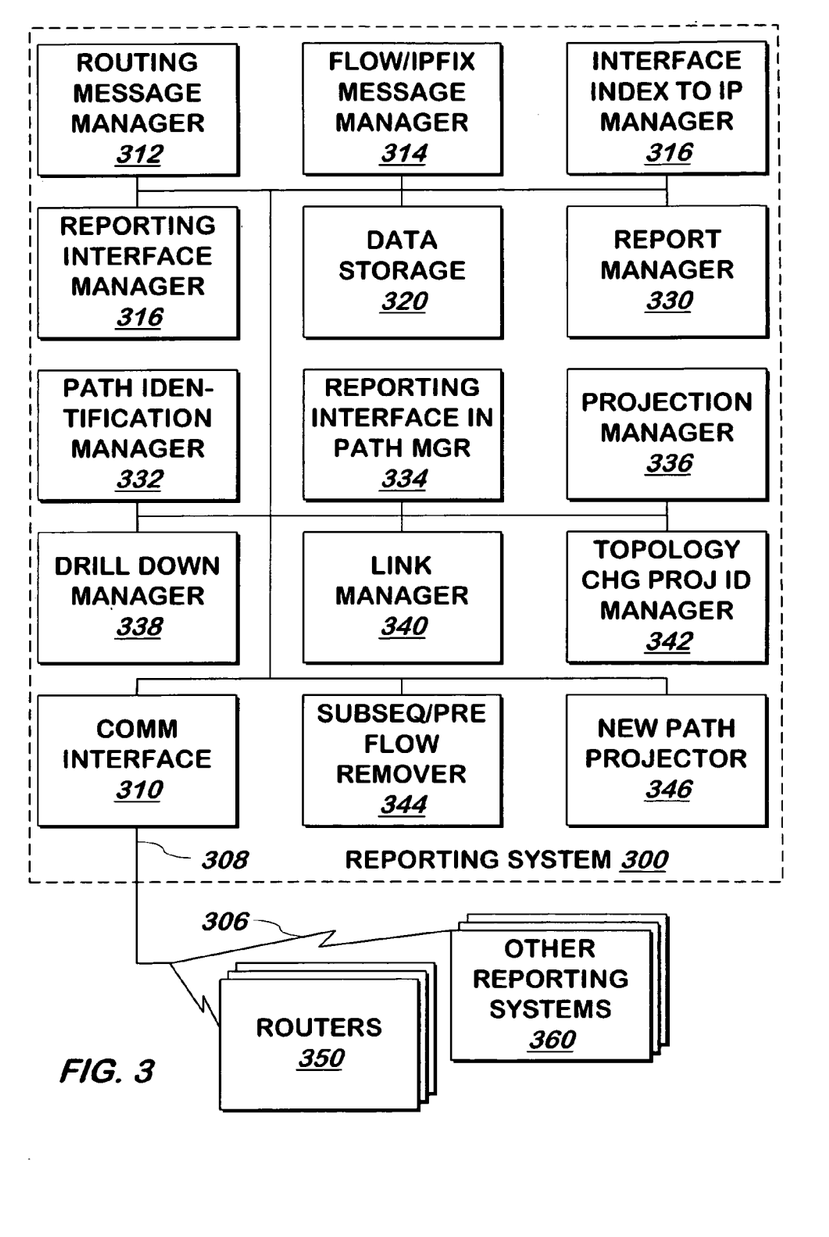
FIG. 3 is a block schematic diagram of a system for reporting traffic information according to one embodiment of the present invention.

In one embodiment, any alterations made on behalf of one reporting system 300, 360 will not apply to reports made by different ones of reporting systems 300, 360. Thus, a report that removes a node that is initiated by one reporting system 300, 360 will not affect reports initiated at a different reporting system 300, 360.

As information is requested by one reporting system, previous changes requested for that system may remain in effect until the initiating reporting system removes one such change or all such changes.

System.

Referring now to FIG. 3, a system for reporting traffic information is shown according to one embodiment of the present invention.

Communication.

Communication interface 310 is a conventional communication interface running suitable communications protocols, such as TCP/IP and Ethernet. All communication into or out of the reporting system 300 is made via communications interface 310 via input/output 308. Input/output 308 may be coupled to one or more networks, such as an Ethernet network, the Internet, or both.

Raw Data Collection.

Routing message manager 312 receives routing messages from the routers 350 in a network that are in an autonomous system and timestamps and stores them into a routing messages table in data storage 320 as described above. Data storage 320 includes conventional memory or disk storage and may include a conventional database.

Flow/IPFix message manager 314 receives from some or all of the routers 350 in one or more autonomous systems the flow messages or IPFix messages or other similar messages as described above and timestamps and stores them into a flow messages table in data storage 320 along with a unique flow identifier it assigns to the flow. When a flow message is received, flow/IPFix message manager 314 signals interface index to IP manager 316 with the IP address and interface index of the source of the message as contained in the message or its IP header.

Additionally, each time flow/IPFix message manager 314 receives a flow message, it builds a snapshot of the routes using the routing messages in the routing messages table applicable at the time and stores the snapshot in a routing table in data storage 320 as described above.

When so signaled, interface index to IP manager 316 checks an interface index table for the IP address and interface index. If the interface index is in the table with an ending date and time within a threshold amount of time from the current date and time, interface index to IP manager 316 replaces the ending date and time with the current date and time. If the IP address and interface index are not in the table or the ending time for that IP address and interface index is more than the threshold amount of time from the current time, interface index to IP manager 316 adds a new entry containing the IP address and interface index is to the interface index table, with a start and end date equal to the current date and time, and uses the IP address of the router and interface index to retrieve, as described above, the IP address assigned to that interface index of the router whose IP address it received, and stores the address in the table.

Report Specification.

Report manager 330 provides a user interface to allow a user to specify a report and parameters, including a period of interest, for the report as described above. Report manager 330 builds the specification and a unique serial number for the report into a report object and provides it to path identification manager 332.

Select Flows and Build Paths.

When it receives the report object, path identification manager 332 selects the first flow corresponding to the report parameters in the report object it receives and uses the snapshots in the routing table (or the routing messages in the routing messages table or both) to identify the applicable path or paths for the selected flow as described above, and stores the path or paths into a path object and provides the path object and the report object to reporting interface in path manager 334.

Identify Reporting Interfaces in any Path.

When it receives the path object and the report object, reporting interface in path manager 334 uses the IP addresses in the interface index table to mark in the path object any link in any path leading to a reporting interface as described above and provides the path object and the report object to projection manager 336.

In one embodiment, instead of building the entire path and then marking the nodes in the path that correspond to a reporting interface, the path is built by the path identification manager 332 to the node before the first reporting interface in the path and path identification manager 332 provides the path object and the report object to projection manager 336 and reporting interface in path manager 334 is not used. A reporting interface is in the path of the flow if an entry for an IP address along the path of the flow is in the interface index table having a start date and time and end date and time encompassing the date and time the flow being projected was received. If the entry only encompasses a portion of the start and end date and times of the flow, the flow may be treated as two flows, one that has the interface index in the path and another that does not, with the traffic for each flow apportioned in proportion to the applicable times.

Project Flow onto Path.

When it receives the path object and the report object, projection manager 336 projects the flow onto each link in the path in a projection table in data storage 320 as described above. To project the flow, some or all of the traffic from the flow is added to a row for each link in the path in the path object up to, but not including (in one embodiment) any link marked by reporting interface in path manager 334 or to the end of the path in embodiments in which a path is only identified to a reporting interface. The starting and ending time applicable to the projection onto that link as described above, the flow identifier of the selected flow and the report identifier are added to the row in the projection table. Projection manager 336 may project the flow into different paths or different paths at different times as described above. When it has completed projecting the flow as described above, projection manager 336 signals path identification manager 332, which selects another flow and the process described above is repeated for the selected flow by path identification manager 332 and projection manager 336 until all applicable flows have been processed in this manner. When all applicable flows have been processed, path identification manager 332 so indicates to report manager 330.

Build Report, Allow Drill Downs.

When it receives the indication, report manager 330 uses the report identifier it assigned as described above to locate the projections in the projection table that are applicable to the report and displays the report (e.g. an animation of the cumulative traffic carried by each link over the period of interest) as described above.

Report manager 330 also provides one or more user interface controls to allow the user to see detailed information (e.g. about a link or node) as described above (referred to as a "drilling down"). If the user uses the user interface control, for example, by clicking on a link or node displayed as described above, report manager 330 provides an indication of the user interface control (e.g. an identifier of the link or node) to drill down manager 338.

Process Drill Down and Determine if Projections from Flow/IPFix Messages should be Linked to One Another.

When it receives the user interface control indication, drill down manager 338 adds the indication to a drill down object and displays types of data the user can view, allows the user to select types and values, and then displays the applicable values of any type selected as described above. As it accepts types and values from the user, it adds the types and values, to the drill down object.

If the user selects a type that could require information from one or more projections of one or more other flow messages that are not part of the projections of flow messages remaining in the report but that correspond to flow messages remaining in the report as described above, drill down manager 338 links in the projection table such projections of such other flow messages that correspond to the flow messages remaining in the report as described above, and then treats such linked projections as remaining in the report by displaying data values from them for a data type selected by the user. As the user continues to drill down, messages that do not correspond to the currently applicable set of drill down values of selected types are not considered to be remaining in the report by drill down manager 338.

Simulation of Topology Change.

In one embodiment, a user may indicate to report manager 330 that the user wishes to simulate the change in network topology as described above. In such event, report manager 330 receives a specification of the link or node to be removed or added, along with weights and any new links to the new node or a new weight (which may occur graphically on the map and report manager 330 receives a click onto the map, converts the click into an identifier of a link or node using the position used to display links and nodes) and an indication of the topology change to be made (e.g. add a link, remove a link, add a node and one or more links between the added node and any existing nodes, remove a link, or increase or decrease a weight or cost of a link) and determines whether the topology change is to remove a node or link or increase a link weight or cost.

If the topology change is to add a link or node (and associated one or more links) or to decrease the weight or cost of a link, report manager 330 adds the topology change specifications to a topology change table in data storage 320 associated with a unique identifier of the change and reruns the report. All paths are computed for the report using the topology change specifications in the topology change table in addition to the routing messages and/or snapshots, except that the topology change specifications take precedence if there is a conflict with the routing messages (e.g. the link cost will be that specified by the topology change specifications even though the routing messages advertise a different cost. In one embodiment, the topology change specifications are assumed in effect during the entire period of interest.

If the topology change is to remove a node or link or increase a link weight or cost, report manager 330 provides an indication of the changes to be simulated and a unique serial number of the topology change simulation to topology change identification manager 342.

When it receives the identifier of the link or node to be simulated as having been removed or identifier of the link whose weight is being simulated as having been changed and the new weight, and the serial number, topology change identification manager 342 identifies in the projection table in data storage 320 the projections through the specified node or link as described above and marks them with the serial number in the projection table (or provides the serial number and an identifier of each such projection in a deleted projection table in data storage 320). Report manager 330 and drill down manager 338 ignores all such marked or identified projections when providing reports or data values.

Topology change identification manager 342 provides the serial number and identifier of the removed node or link to subsequent/preceding flow projection remover 344, which similarly marks or otherwise identifies the subsequent and optionally previous flow projections of projections of flows corresponding to flows of projections marked by topology change identification manager 342 with the received serial number as having been removed in the same manner as topology change identification manager 342 as described above. As projections are marked for removal, topology change identification manager 342, subsequent/previous flow projection remover 344 or both may identify the earliest node from which each flow is to be newly projected, along with the identifier of the flow message for that node and the serial number into a new path table in data storage 320. Each time subsequent/preceding flow remover 344 has performed any removals of all such projections corresponding to a flow marked for removal by projection identification manager 342, it provides the serial number and identifier of the removed node or link to new path projector 346, which identifies a new path for each flow (or corresponding flow) without using the removed link or node as described above or using the changed link weight or cost, and projects the path into the projection table, with the serial number (to allow the removal of the link or node to be undone).

When subsequent preceding flow remover 344 completes marking as described above, it signals new path projector 346 as described above. New path projector 346 signals report manager 330, which generates the animation, and allows additional nodes or links to be removed, removals to be undone, or the display of data values from drill downs using the applicable projections, including the projections resulting from the actions performed as described above.

Distributed Systems.

In one embodiment, there are other reporting systems 360, each similar or identical to reporting system 300 described above. Some of routers 350 provide their flow messages or IPFix messages to reporting system 300 and other of routers 350 provide their flow messages or IPFix messages to one of the other reporting systems 360.

Distribution of Reporting Interface Information.

In a distributed environment, the reporting interface managers 316 in each reporting system 300, 360 periodically or occasionally broadcasts the IP addresses of the reporting interfaces in the interface index table for those entries for which flow or IPFix messages were received by that reporting system 300, 360 and that have an ending date and time that is less than a threshold amount of time from the current date and time, along with its own address. The reporting interface managers 316 in all such systems monitor similar messages provided by other reporting interface managers 316 and, for any IP address that is not in the table, or for which the most recent end date is older than a threshold amount of time, stores the IP addresses of such reporting interfaces in the interface index table, with an indication that such interface indices are remote, along with the IP address of the reporting system that sent such message, with a start and end date and time equal to the current date and time. For reporting interfaces that are in the table and have an ending date and time within a threshold amount of time, reporting interface manager 316 updates the end time to the current date and time.

It is noted that the flow messages received by one of the reporting systems 300, 350 need not be distributed to the other reporting systems 300, 350. Although such transmission is possible and may be used in one embodiment, in another embodiment, no such transmission is performed. Instead, only the information needed to provide the reports or other information desired by the user is transmitted on an as needed basis, as will now be described.

Distribution of Report Information.

When report manager 330 in reporting system 300 receives the parameters for the report, such as the period of interest and any other limitations, report manager 330 builds the parameters for the report into a remote report object that may contain additional information such as the number of divisions of the period of interest it will use for an animation. Report manager 330 in reporting system 300 provides the remote report object to the report managers 330 in the other reporting systems 360. A report identifier that contains an identifier of the reporting system appended to the report identifier the report manager uses as described above (or another globally unique report identifier) may also be contained in the remote report object. Such report managers 330 in the other reporting systems 360 provide a response object that contains information the report manager 330 in the reporting system 300 can use to generate the report.

If a topology change is being simulated as described above, the specification and indication of the topology change or changes are distributed to the other reporting systems via report managers 330 in each of the reporting systems. Each such reporting system simulates the topology change in the same manner as described above for use in the reports or drill down information.

To provide such a response object, the report manager 330 in each other reporting system 350 builds a report object based on the remote report object, including the report identifier. For example, the remote report object may contain indicate the report is an animation of all links (and may include the period of interest and any other constraints specified by the user) and the report object contains such information as parameters. The report object is provided by the receiving report manager 330 to the path identification manager 332 in the same reporting system as described above, and operation of the reporting system proceeds as described above in each other reporting system 350. The projection table that results is used by the report manager 330 in each other reporting system 360 to return the information that can be used for the report in the response object. For example, in one embodiment, the response object contains identifiers of each link onto which flows were projected in response to the report object, and using the information in the projection table for that report object, for each of the subdivisions of the period of interest, the cumulative traffic projected onto that link. The report manager 330 in the other reporting system 360 provides the response object to the report manager 330 that sent the remote report object and that report manager 330 integrates the information from all such response objects into the report it provides to display the animation without receiving all of the flow messages. In another embodiment, the applicable flow or IPFix messages are provided by the report managers 330 of the reporting systems 360 and such flow or IPFix messages are used as described above along with those stored as described above to generate the report as described above.

Distribution of Drill Down Information.

In one embodiment, when the user selects a type that could require information from one or more projections of one or more other flow messages that are not part of the projections of flow messages remaining in the report, but that correspond to flow messages remaining in the report as described above, drill down manager 388 in the reporting system 300, in addition to the linking performed above, provides a remote link object to the drill down managers in the other reporting systems 350 that contain the currently applicable data types and values, as well as the currently requested data type. The remote link object contains the report identifier appended to the identifier of the reporting system 300 and the serial number assigned to the drill down request. Such drill down managers 388 use the report identifier to locate the projections made for the report as described above. If no such projections have been made, the remote link object provides the indications and parameters of the report to allow the drill down managers 338 in the other reporting systems to build their own report objects and provide them to path identification manager 332, which operate as describe above to project the applicable flows onto the links as described above. Drill down managers 338 then link their own local flow information using the information in the remote link object in the same manner as was described above, identify the applicable values, and then provide the applicable data values of the currently requested data type specified in the remote link object into a link response object and provide it to the drill down manager 338 in the reporting system 300. Such drill down manager 338 will append any data values received in link response objects that are not already part of the into its display.

In one embodiment, if the currently requested data type is one that would have been linked as described above, the drill down managers 338 link the projections of the corresponding flows as described above and include the applicable values of the applicable flows and the linked flows when providing the link response objects. In another embodiment drill down managers 338 provide the flow messages that should be linked in the link response object.

It is noted that as changes are made by a user as described herein, the changes may cumulate for that user, until a new report is requested by the user. At that point, the report manager 330 being used to generate the report for the user may discard any previous changes made for that user as described herein, and may instruct the report managers 330 in the other reporting systems 360 to do the same and those report managers comply with such instruction.

In one embodiment, reports are made via a reporting system 300 that either retrieves from the other reporting systemd 360 the flow messages that were received during the period of interest, or via a reporting system 360 that receives or retrieves all of them from the other reporting systems 360.

APPENDIX A

Information Used to Retrieve Interface Index Information from Routers Using SNMP or by Logging into the Routers 1. Information, Including Object Identifiers, Used to Retrieve the IP Addresses and Indices of the Interfaces Via SNMP From SNMP, the interface index information is retrieved from if Table, if XTable in IF-MIB and ipAddrTable in IP-MIB. The OIDs (object identifiers) for the particular entries are as follows:
ipAddrTable of IP-MIB
"Snmpv2-SMI::mib-2.ip.ipAddrTable.ipAdEntAddr"={1.3.6.1.2.1.4.20.1.1},
"Snmpv2-SMI::mib-2.ip.ipAddrTable.ipAdEntIfIndex"={1.3.6.1.2.1.4.20.1.2},
"Snmpv2-SMI::mib-2.ip.ipAddrTable.ipAdEntNetMask"={1.3.6.1.2.1.4.20.1.3},
if Table of IF-MIB
"IF-MIB::ifIndex"={1.3.6.1.2.1.2.2.1.1},
"IF-MIB::ifDescr"={1.3.6.1.2.1.2.2.1.2},
"IF-MIB::ifType"={1.3.6.1.2.1.2.2.1.3},
"IF-MIB::ifMtu"={1.3.6.1.2.1.2.2.1.4},
"IF-MIB::ifSpeed"={1.3.6.1.2.1.2.2.1.5},
"IF-MIB::ifPhysAddress"={1.3.6.1.2.1.2.2.1.6},
"IF-MIB::ifAdminStatus"={1.3.6.1.2.1.2.2.1.7},
"IF-MIB::ifOperStatus"={1.3.6.1.2.1.2.2.1.8},
IfXTable of IF-MIB (augments above)
"IF-MIB::ifIndex"={1.3.6.1.2.1.2.2.1.1},
"IF-MIB::ifHigh-Speed"={1.3.6.1.2.1.31.1.1.1.15},
For Alcatel routers, additional information is retrieved from vRtrIfTable and vRtrIpAddrTable in TIMETRA-VRTR-MIB.
vRtrIfTable
"vRtrIfRowStatus"={1.3.6.1.4.1.6527.3.1.2.3.4.1.2},
"vRtrIfType"={1.3.6.1.4.1.6527.3.1.2.3.4.1.3},
"vRtrIfName"={1.3.6.1.4.1.6527.3.1.2.3.4.1.4},
"vRtrIfPortId"={1.3.6.1.4.1.6527.3.1.2.3.4.1.5},
"vRtrIfEncapValue"={1.3.6.1.4.1.6527.3.1.2.3.4.1.7},
"vRtrIfAdminState"={1.3.6.1.4.1.6527.3.1.2.3.4.1.8},
"vRtrIfOperState"={1.3.6.1.4.1.6527.3.1.2.3.4.1.9},
"vRtrIfPhysicalAddress"={1.3.6.1.4.1.6527.3.1.2.3.4.1.11},
"vRtrIfMtu"={1.3.6.1.4.1.6527.3.1.2.3.4.1.25},
"vRtrIfQosPolicyId"={1.3.6.1.4.1.6527.3.1.2.3.4.1.26},
"vRtrIfDescription"={1.3.6.1.4.1.6527.3.1.2.3.4.1.34},
"vRtrIfServiceId"={1.3.6.1.4.1.6527.3.1.2.3.4.1.37},
"vRtrIfGlobalIndex"={1.3.6.1.4.1.6527.3.1.2.3.4.1.63},
"vRtrIfDelaySeconds"={1.3.6.1.4.1.6527.3.1.2.3.4.1.64},
vRtrIpAddrTable
"vRiaRowStatus"={1.3.6.1.4.1.6527.3.1.2.3.6.1.2},
"vRiaIpAddress"={1.3.6.1.4.1.6527.3.1.2.3.6.1.3},
"vRiaNetMask"={1.3.6.1.4.1.6527.3.1.2.3.6.1.4},
Information Useful for Retrieving Interface Index Information by Logging into the Routers:
a) Cisco IOS: the relevant information is obtained from "show snmp mib ifmib ifindex", "show interface" and "show ip interface".
b) Juniper JunOS: the relevant information is obtained via netconf/Junoscript (a type of router login) from "get-iftype-query", "get-interface-information"

What is claimed is:

1. A method of displaying traffic information for a network, comprising:
receiving routing information for the network, wherein the routing information comprises at least one of at least one timestamped routing message, at least one IP address, and at least one interface index;
receiving a plurality of traffic information for the network from a plurality of interfaces of a plurality of routers in the network, the traffic information comprising a plurality of flow messages each describing at least one packet that transited the network, at least one flow message describing a packet different from at least one other flow message;
identifying at least one potential path for each of the at least one packet with at least one of the at least one timestamped routing message, the path for one of the at least one packet starting from at least nearby one of the plurality of router interfaces from which one of the plurality of flow messages was received; and
projecting information from at least some of the plurality of flow messages onto at least one data structure representing each of said at least one potential path identified for said at least one timestamped routing message, such that, for at least one of the plurality of flow messages projected, any effects said projection of said at least some of the plurality of flow messages go not farther than a different router interface from which a different flow message was received.

2. The method of claim 1, wherein the timestamp is associated with the date and time at which the routing message was retrieved.

3. The method of claim 1, wherein at least one of the at least one IP address and at least one interface index is retrieved from a system administrator.

4. The method of claim 1, wherein the routing information is updated occasionally or periodically.

5. The method of claim 1, wherein each of the at least one potential path is at least one snapshot, further wherein the snapshot comprises at least one potentially applicable routing messages of the at least one timestamped routing message created each time said one of the plurality of flow messages is received.

6. The method of claim 1, wherein at least one node of the each of said at least one potential path and serial numbers of the at least some of the plurality of flow messages are associated and stored together.

7. A system for displaying traffic information for a network, comprising:
a routing message manager having an input coupled for receiving routing information for the network, the routing message manager for providing at an output the routing information;
a flow/ipfix message manager having an input coupled for receiving a plurality of traffic information for the network from a plurality of interfaces of a plurality of routers in the network, the traffic information comprising a plurality of flow messages each describing at least one packet that transited the network, at least one flow message describing a packet different from at least one other flow message, the flow/ipfix message manager for providing at an output the traffic information;
- a path identification manager having an input coupled to the routing message manager output and to the flow/ipfix message manager output, for identifying and providing at an output at least one potential path for each of the at least one packet with at least one of the at least one timestamped routing message, the path for one of the at least one packet starting from at least nearby one of the plurality of router interfaces from which one of the plurality of flow messages was received; and
- a projection manager having an input coupled to the path identification manager output for receiving at least one of the at least one potential path, and to the flow/ipfix message manager for receiving at least some of the plurality of traffic information, the projection manager for projecting via an output, information from at least some of the plurality of flow messages onto at least one data structure representing the each of said at least one potential path identified for said at least one timestamped routing message, such that, for at least one of the plurality of flow messages projected, any effects said projection of said at least some of the plurality of flow messages go not farther than a different router interface from which a different flow message was received.

8. The system of claim 7, wherein the timestamp is associated with the date and time at which the routing message was retrieved.

9. The system of claim 7, wherein at least one of the at least one IP address and at least one interface index is retrieved from a system administrator.

10. The system of claim 7, wherein the routing information is updated occasionally or periodically.

11. The system of claim 7, wherein each of the at least one potential path is at least one snapshot, further wherein the snapshot comprises at least one potentially applicable routing messages of the at least one timestamped routing message created each time said one of the plurality of flow messages is received.

12. The system of claim 7, wherein at least one node of the each of said at least one potential path and serial numbers of the at least some of the plurality of flow messages are associated and stored together.

13. A computer program product comprising a computer useable medium having computer readable program code embodied therein for displaying traffic information for a network, the computer program product comprising computer readable program code devices configured to cause a computer system to:
- receive routing information for the network, wherein the routing information comprises at least one of at least one timestamped routing message, at least one IP address, and at least one interface index;
- receive a plurality of traffic information for the network from a plurality of interfaces of a plurality of 10 routers in the network, the traffic information comprising a plurality of flow messages each describing at least one packet that transited the network, at least one flow message describing a packet different from at least one other flow message;
- identify at least one potential path for each of the at least one packet with at least one of the at least one timestamped routing message, the path for one of the at least one packet starting from at least nearby one of the plurality of router interfaces from which one of the plurality of flow messages was received; and
- project information from at least some of the plurality of flow messages onto at least one data structure representing each of said at least one potential path identified for said at least one timestamped routing message, such that, for at least one of the plurality of flow messages projected, any effects said projection of said at least some of the plurality of flow messages go not farther than a different router interface from which a different flow message was received.

14. The computer program product of claim 13, wherein the timestamp is associated with the date and time at which the routing message was retrieved.

15. The computer program product of claim 13, wherein at least one of the at least one IP address and at least one interface index is retrieved from a system administrator.

16. The computer program product of claim 13, wherein the routing information is updated occasionally or periodically.

17. The computer program product of claim 13, wherein each of the at least one potential path is at least one snapshot, further wherein the snapshot comprises at least one potentially applicable routing messages of the at least one timestamped routing message created each time said one of the plurality of flow messages is received.

18. The computer program product of claim 13, wherein at least one node of the each of said at least one potential path and serial numbers of the at least some of the plurality of flow messages are associated and stored together.

* * * * *